United States Patent
Plom et al.

(10) Patent No.: US 11,392,347 B2
(45) Date of Patent: Jul. 19, 2022

(54) AUDIO MESSAGING INTERFACE ON MESSAGING PLATFORM

(71) Applicant: Twitter, Inc., San Francisco, CA (US)

(72) Inventors: Richard Plom, San Francisco, CA (US); Reed Martin, San Francisco, CA (US); Max Rose, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/904,526

(22) Filed: Jun. 17, 2020

(65) Prior Publication Data

US 2021/0397411 A1 Dec. 23, 2021

(51) Int. Cl.
*G06F 3/16* (2006.01)
*G06F 3/0484* (2022.01)
*G10L 15/26* (2006.01)
*H04M 3/53* (2006.01)

(52) U.S. Cl.
CPC ............ *G06F 3/167* (2013.01); *G06F 3/0484* (2013.01); *G10L 15/26* (2013.01); *H04M 3/5307* (2013.01)

(58) Field of Classification Search
CPC .... G06F 3/167; G06F 3/0484; H04M 3/5307; G10L 15/26
See application file for complete search history.

(56) References Cited

U.S. PATENT DOCUMENTS

| 9,992,470 B1* | 6/2018 | Hofmann | G06F 3/0482 |
| 11,057,232 B1* | 7/2021 | Frolovichev | H04L 12/1818 |
| 2002/0031262 A1* | 3/2002 | Imagawa | H04N 21/4223 382/190 |
| 2011/0175915 A1* | 7/2011 | Gehring | H03G 5/165 345/440 |

(Continued)

FOREIGN PATENT DOCUMENTS

WO WO 2016/057843 4/2016

OTHER PUBLICATIONS

Veltman et al. "Audiogram README" May 23, 2019. https://web.archive.org/web/20190523071714/https://github.com/nypublicradio/audiogram/ (Year: 2019).*

(Continued)

*Primary Examiner* — Kieu D Vu
*Assistant Examiner* — Alvaro R Calderon, IV
(74) *Attorney, Agent, or Firm* — Fish & Richardson P.C.

(57) ABSTRACT

Methods, systems, and apparatus, including computer programs encoded on computer storage media, for audio messaging interface for messaging platform. One of the methods includes receiving, by a first client on a first user device, a request to record an audio message, wherein the first client is configured to provide a user interface for the platform for a user using the first user device who is logged in to a user account on the platform; recording audio through a microphone of the first user device; generating a platform message by (i) generating a video file that includes the recorded audio as an audio portion of the video file and programmatically (Continued)

generated minimal video content as a video portion of the video file, and (ii) including the video file in the platform message; and posting, by the first client, the platform message to the platform, in response to a post request.

29 Claims, 6 Drawing Sheets

(56) References Cited

U.S. PATENT DOCUMENTS

| | | | | |
|---|---|---|---|---|
| 2013/0226578 | A1* | 8/2013 | Bolton | G06Q 10/1057 |
| | | | | 704/235 |
| 2015/0042823 | A1 | 2/2015 | Relf | |
| 2016/0142361 | A1 | 5/2016 | Grossman et al. | |
| 2017/0060520 | A1* | 3/2017 | Cohen | G06F 3/165 |
| 2017/0062006 | A1* | 3/2017 | Plom | H04N 9/87 |
| 2018/0191792 | A1* | 7/2018 | Paul | H04L 65/605 |
| 2018/0192142 | A1 | 7/2018 | Paul | |
| 2019/0051272 | A1* | 2/2019 | Lewis | G10H 1/42 |

OTHER PUBLICATIONS

Audiogram. "Audiogram—The Basics." May 10, 2018. https://web.archive.org/web/20180510153419/https://docs.google.com/document/d/1US1llZexMtJi0uIYT_GKShFID2nRjRmZuVB024zOjSo/edit (Year: 2018).*

Kastrenakes, J. "Anchor can now transform podcasts into shareable videos." Aug. 8, 2017. https://web.archive.org/web/20190129064455/https://www.theverge.com/2017/8/8/16106924/anchor-podcast-social-videos-twitter-facebook-instagram (Year: 2017).*

Chirbit. "Chirbit—Learn More." Apr. 1, 2019. https://web.archive.org/web/20190401081607/https://www.chirbit.com/learnmore (Year: 2019).*

Editframe. "Editframe." Apr. 22, 2020. https://web.archive.org/web/20200422194159/https://editframe.com/ (Year: 2020).*

EchoWave. "EchoWave." May 14, 2020. https://web.archive.org/web/20200514224734/https://echowave.io/ (Year: 2020).*

Patterson et al. "Your Tweet, your voice." Jun. 17, 2020. https://blog.twitter.com/en_us/topics/product/2020/your-tweet-your-voice (Year: 2020).*

Twitter. "How to Tweet with your voice." Jun. 17, 2020. https://web.archive.org/web/20200617213928/https://help.twitter.com/en/using-twitter/voice-tweet (Year: 2020).*

Twitter. "How to share and watch videos on Twitter." Jun. 16, 2019. https://web.archive.org/web/20190616120406/https://help.twitter.com/en/using-twitter/twitter-videos (Year: 2019).*

Koenen, R. "MPEG-4 Overview." Mar. 2002. https://web.archive.org/web/20190325082231/https://mpeg.chiariglione.org/standards/mpeg-4 (Year: 2002).*

Montelli, C. "How to send a voice message on Snapchat to your friends." Apr. 15, 2020. https://web.archive.org/web/20200609141849/https://www.businessinsider.com/how-to-send-voice-message-on-snapchat (Year: 2020).*

SoundCloud. "SoundCloud Brings Comments to the Waveform on Mobile." Apr. 24, 2019. https://web.archive.org/web/20190628072644/http://press.soundcloud.com/172655-soundcloud-brings-comments-to-the-waveform-on-mobile (Year: 2019).*

SoundCloud. "Sharing tracks or playlists to Twitter." May 15, 2018. https://web.archive.org/web/20180515001812/https://help.soundcloud.com/hc/en-us/articles/115003566988-Sharing-tracks-or-playlists-to-Twitter (Year: 2018).*

SoundCloud. "Recording with the Android app." Aug. 15, 2018. https://web.archive.org/web/20180815124019/https://help.soundcloud.com/hc/en-us/articles/115003450567 (Year: 2018).*

SoundCloud. "Adding an image when uploading a track." Feb. 13, 2019. https://web.archive.org/web/20190213123548/https://help.soundcloud.com/hc/en-us/articles/115003565268-Adding-an-image-when-uploading-a-track (Year: 2019).*

Mashnol. "How to Post Voice Message and Audio Comment on FACEBOOK." Dec. 3, 2017. https://web.archive.org/web/20171203070950/https://mashnol.org/post-a-voice-message-on-facebook/ (Year: 2017).*

International Search Report and Written Opinion in International Appln. No. PCT/US2021/037707, dated Dec. 21, 2021, 18 pages.

Communication in International Appln. No. PCT/US2021/037707, dated Oct. 1, 2021, 11 pages.

* cited by examiner

AUDIO MESSAGING INTERFACE ON MESSAGING PLATFORM

BACKGROUND

This specification relates to generating and displaying audiovisual content on online social messaging platforms. Social messaging platforms and network-connected personal computing devices allow users to create and share content across multiple devices in real-time.

Sophisticated mobile computing devices such as smartphones and tablets make it easy and convenient for people, companies, and other entities to use online social networking messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform, without specific designation by the authoring user.

SUMMARY

This specification describes technologies for a user interface that facilitates recording, editing, and posting audiovisual content to an online social messaging platform. The technologies generally involve receiving a request by a user device to record audio for an audio message. An audio message is a message of an online social messaging platform that includes audio content, including videos that have a soundtrack. In response to the request, the user device records audio by a microphone on the user device. After the recording is finished, the user device automatically generates an audio message with the recorded audio, and posts the audio message to the platform.

A user device can play back the recorded audio along with a graphic or animation that was displayed while the audio was recording. The user device can receive a confirmation that the audio recording is ready to be posted as part of an audio message. The user device can record the audio and generate a corresponding video. The video includes a soundtrack of the audio recording and video frames representing the animation played while the user device recorded the audio. In some implementations, the user device receives inputs indicating edits to make to the video. The user device, in response to the inputs, can modify audiovisual properties of the video, e.g., by adding sound effects to the video's soundtrack. The video frames can be of minimal video content, such as a low resolution image or solid color, acting as a placeholder for encoding the recorded audio in an audiovisual—instead of purely audio—format. Codecs for audiovisual file formats, e.g., MPEG-4, are universally available on a variety of different devices, and the user device leverages this available over purely audio formats to encode the recorded audio.

In this way, network bandwidth utilization is reduced, because the audio message can be transmitted having the minimal video content (e.g., having kilobytes of data) to the receiving user device, and the determination and rendering of content to replace the video content can be performed client-side by the user device. User experience is improved while keeping network utilization down, all while still enabling the recorded audio to be processed and played back using any audiovisual codec.

The user device, as part of generating the video with the audio recording soundtrack, can process the audio recording using suitable speech-to-text technology to generate text corresponding to speech recorded in the audio. As part of posting the audio message to the platform, the user device can further include at least a portion of the generated text in the audio message, along with the generated video.

The user device can record the audio, display the corresponding graphic or animation, and then send the audio recording to one or more servers implementing the platform. The server(s) can generate a video for the audio recording, using a locally stored or rendered graphic or animation corresponding to the graphic or animation displayed on the user device. The generated video is generated by the platform server(s) using the locally stored or rendered graphic or animation, which can have a pixel resolution, e.g., 3840×2160 ("4K" resolution), that is higher than the pixel resolution of the user device. The platform server(s) then automatically post the audio message with the server-generated video which can be of a higher resolution than the resolution of a user device-generated video.

In some implementations, a user device receives an audio message, wherein the recorded audio is encoded as a video with frames having minimal video content. When the user device plays back the audio message, the user device discards the video frames and instead renders a graphic, image, or animation to accompany the recorded audio of the message as it is played back. By rendering a graphic, image, or animation in time for playback, the user device obviates the need for detailed, high-resolution video content from being stored as part of the audio message, and does so without sacrificing content quality in the user experience.

The subject matter described in this specification can be implemented in particular embodiments so as to realize one or more of the following advantages. Audio can be efficiently recorded and edited before being posted to a social messaging platform. A user interface as described in this specification facilitates recording sounds originating near a recording user device. Audio messages facilitate disseminating information to the platform by including audio which can provide more information and context than messages that include text alone.

After recording, the audio can be automatically played back and the user interface provides several options for receiving user input for modifying the recorded audio at different points in time of the recording. After the audio is recorded and modified, the recording can be automatically posted to a messaging platform as a message in a message stream, accessible to users of the platform. The user device can automatically be prepared to record another audio message by the same user interface, which can improve the rate at which information is disseminated to the platform because of the stream-lined and efficient user experience for generating and editing the messages.

Audio recorded can also be converted to text and automatically posted to the messaging platform as a message containing the text and accompanying audio. In this way, information dissemination is further improved, because audio messages contain information in multiple formats, ready to be consumed in different ways by users of the platform.

The user device can display the graphic or animation at a pixel resolution that is the same as, or less than, the native resolution of the user device's display. However, by sending the audio recording to one or more servers implementing the platform to generate the corresponding video, the server or servers can generate the video at a resolution that is potentially higher than what the user device alone could generate. Either on one or more servers or on the authoring device, the recording can be rendered into multiple versions, multiple formats, form factors, or resolutions that are optimized for specific devices to consume. The optimization can be based on, for example, file size, speed in downloading or uploading the recording, playback quality of the recording on the user device, or a combination of these or other criteria.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
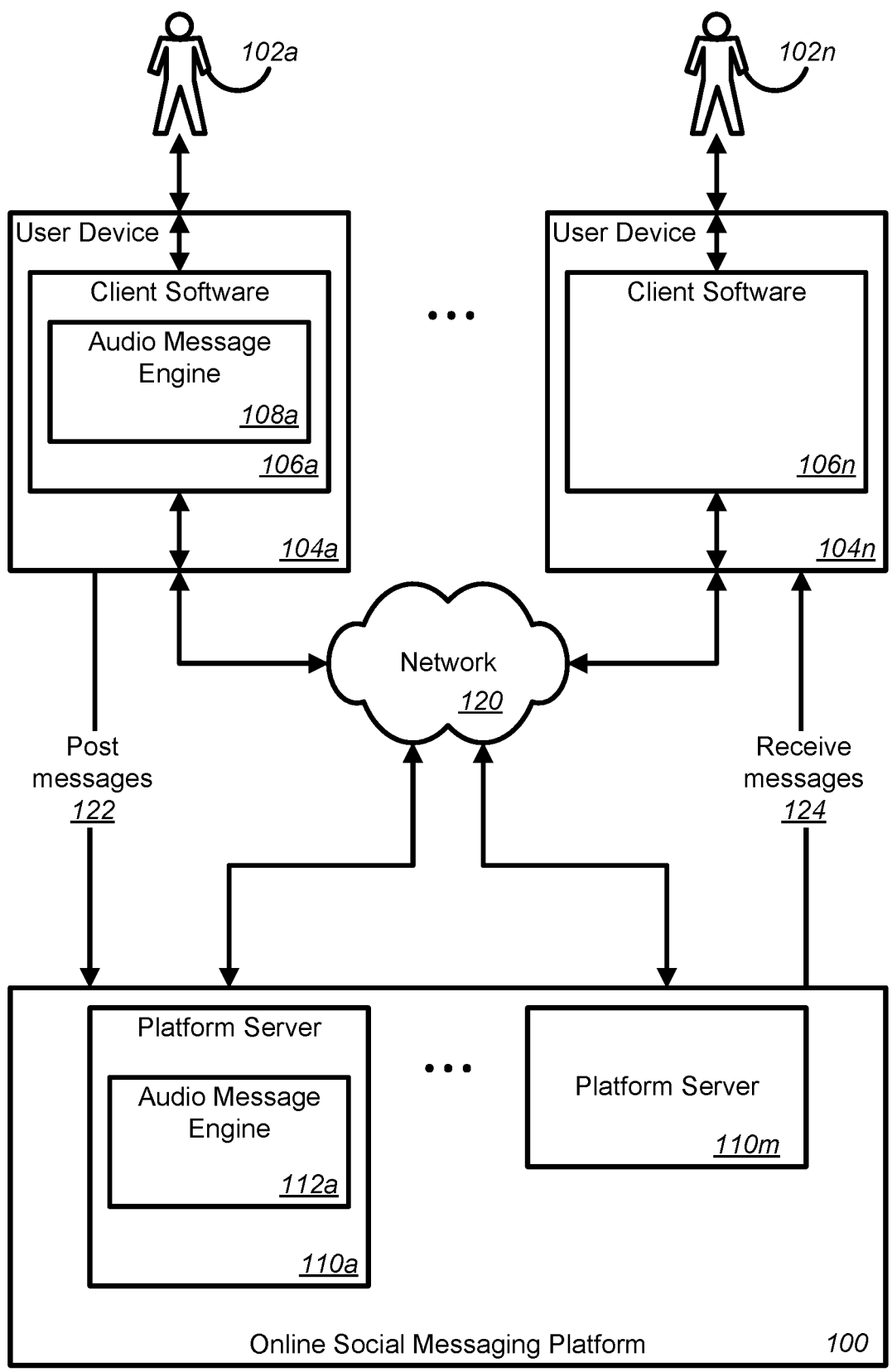
FIG. 1 illustrates an example online social messaging platform and example user devices.

FIG. 1 illustrates an example online social messaging system including an online social messaging platform 100 and user devices 104a-104n operated by users 102a-102n.

A user may be an account holder of a user account, or an authorized user of an account, on the platform 100. A user device can be any Internet-connected device, e.g., a laptop or desktop computer, a smartphone, or an electronic tablet. The user device can be connected to the Internet through a mobile network, through an Internet service provider (ISP), or otherwise. A user device includes a microphone, a display, and client software to record audio and video.

User device 104a is configured with client software 106a, which includes an audio message engine 108a. The functionality of the audio message engine 108a is described in detail, below. The client software 106a also implements a user interface for the user device 104a to receive input from the user 102a, and to generate and modify audio messages before posting the messages to the platform 100. In some implementations and as described in more detail below, the client software 106a is configured to generate and modify messages containing text corresponding to speech recorded by the user device 104a, and also to post the messages to the platform 100. The client software 106a is also configured to provide a user interface for the user 102a to interact with the platform 100.

The client software may be a web browser or an HTML (hypertext markup language) document rendered by a web browser. Or the client software may be a script or another type of software code, e.g., JavaScript code or Java code. Or the client software may be dedicated software, e.g., an installed app or installed application that is designed to work specifically with the platform 100. Or the client software may be or include a Short Messaging Service (SMS) interface, an instant messaging interface, an email-based interface, or an API function-based interface, for example.

The platform 100 is implemented on one or more platform servers 110a-110m that are each implemented on one or more computers located at one or more locations. Each platform server 110a-110m supports connections to and from the user devices over wired or wireless networks of one or more data communication networks 120. Platform server 110a is configured with audio message engine 112a, the functionality of which is described below.

Platform software and client software 106a-106n are configured to enable users 102a-102n to use the platform 100 to post messages 122 to the platform and to use the platform 100 to receive messages 124 posted by other users, as well as to engage in other social activities. In this specification, a message posted to the platform 100 can contain data representing content provided by the author of the message. An author can be a user of the platform, who is identified by a corresponding user account. A message may be a container data type storing the content data. The types of data that may be stored in a message include text, graphics, images, video, and computer code, e.g., uniform resource locators (URLs), for example.

Also in this specification, an audio message is a message that includes audio content. The audio can be stored in any audio format, e.g., WAV (Waveform Audio File), FLAC (Free Lossless Audio Codex), or MP3. Audio content can also be stored in an audiovisual format, e.g., MP4, AVI (Audio Video Interleave), or WMV (Windows Media Video). Purely audio content, i.e., audio content without corresponding video, may still be stored in an audiovisual format. One reason to store audio content in a video file is because user devices are generally configured to encode and decode universally accepted audiovisual formats, e.g., MP4, but not other strictly audio formats, e.g., WAV.

When an audio message includes a video file, the video file includes an audio portion and video content as a video portion making up the video file. Video content includes one or more video frames. The frames can be of a single graphic or animation, e.g., an animated waveform, an animated avatar, an animated graphic, that is looped for the duration of the audio content.

In some implementations, the video content is minimal video content. Minimal video content refers to video content that serves as a placeholder when generating the audio message to include a video. The minimal video content contributes much less to the file size versus the accompanying audio, but allows audio to be saved in an audiovisual format to allow for broader accessibility by devices with universally accepted codecs, such as MPEG-4. For example, the minimal video content can be a solid color or unchanging graphic or image. To further reduce the memory size of the minimal video content, the minimal video content can include an unchanging graphic or image that is monochrome, obviating additional pixel data required in full-color graphics or images. In addition, the minimal video content can be a looped animation, such as an animated avatar or undulating waveform.

The minimal video content can be programmatically generated to provide video content for encoding the recorded audio using an audiovisual codec. After generating the audio message and posting the message to the platform, a receiving user device can receive the audio message as part of a message stream, determine that the audio message includes minimal video content, and replace the minimal video content with higher resolution and more dynamic video content for display, which is rendered by the client installed on the receiving user device. To keep the memory size of the minimal video content small, the minimal video content is not "natural," i.e., of video content recorded, e.g., by a camera on the user device. Instead, the minimal video content is "artificial," i.e., programmatically generated, using any one of a plurality of techniques, e.g., generating frames of video content having a single color or pattern, e.g., a waveform. The artificial nature of the minimal video content allows the content to be used as a placeholder for video data while encoding the recorded audio in an audio-visual format, e.g., mp4, and while keeping the size of the minimal video content small. Video content of a video file generated for an audio message can include an image that relates to the audio content in some way, although the relationship is not necessary. The video frames can also include information describing the audio content, e.g., the time the audio content was authored by a user, or some user-authored text description of the audio content.

In operation, the client software can access the platform so that a user can post and receive messages, view, and curate the user's streams, and view and interact with lists of content items. A stream is a stream of messages on the platform that meet one or more stream criteria. A stream can be defined by the stream criteria to include messages posted by users of the platform.

Figure 2:
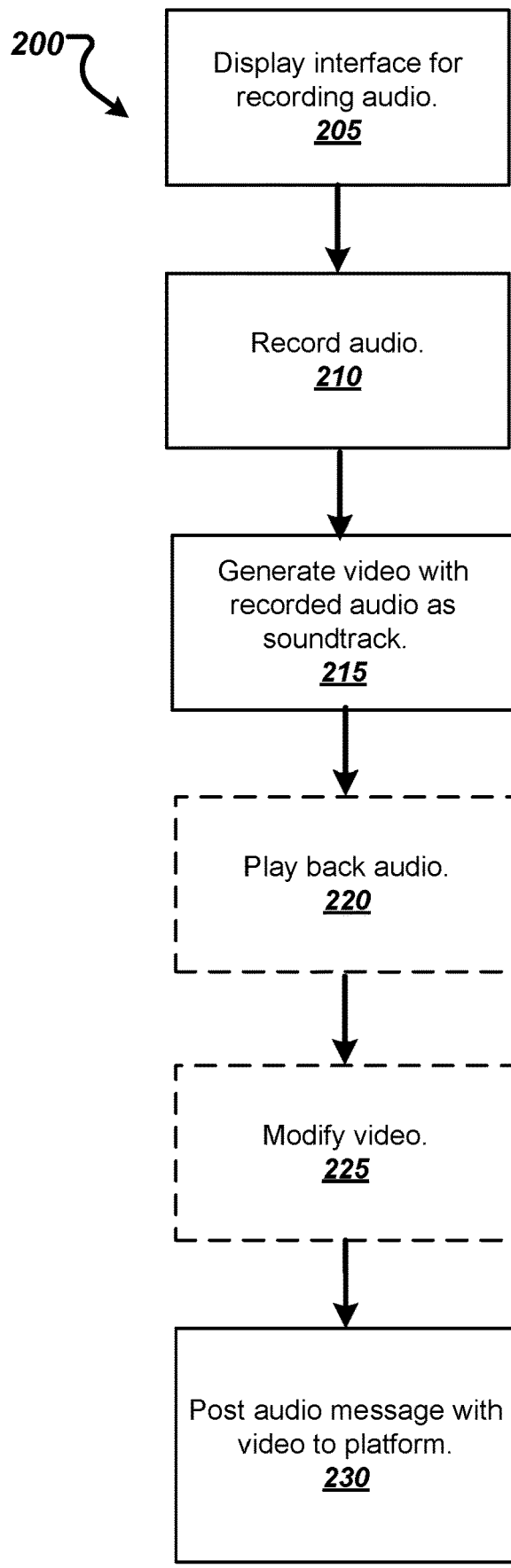
FIG. 2 is a flowchart of an example process for generating an audio message for an online social messaging platform.

FIG. 2 is a flowchart of an example process 200 for generating an audio message for an online social messaging platform. For convenience, the process 200 will be described as being performed by a user device programmed appropriately in accordance with this specification. For example, any one of the user devices 104a of FIG. 1, appropriately programmed with the audio message engine 108a, can perform the process 200. In the description below, reference is made to a single user device, although it is understood that more than one user device can perform the example process 200 in parallel.

Figure 3:
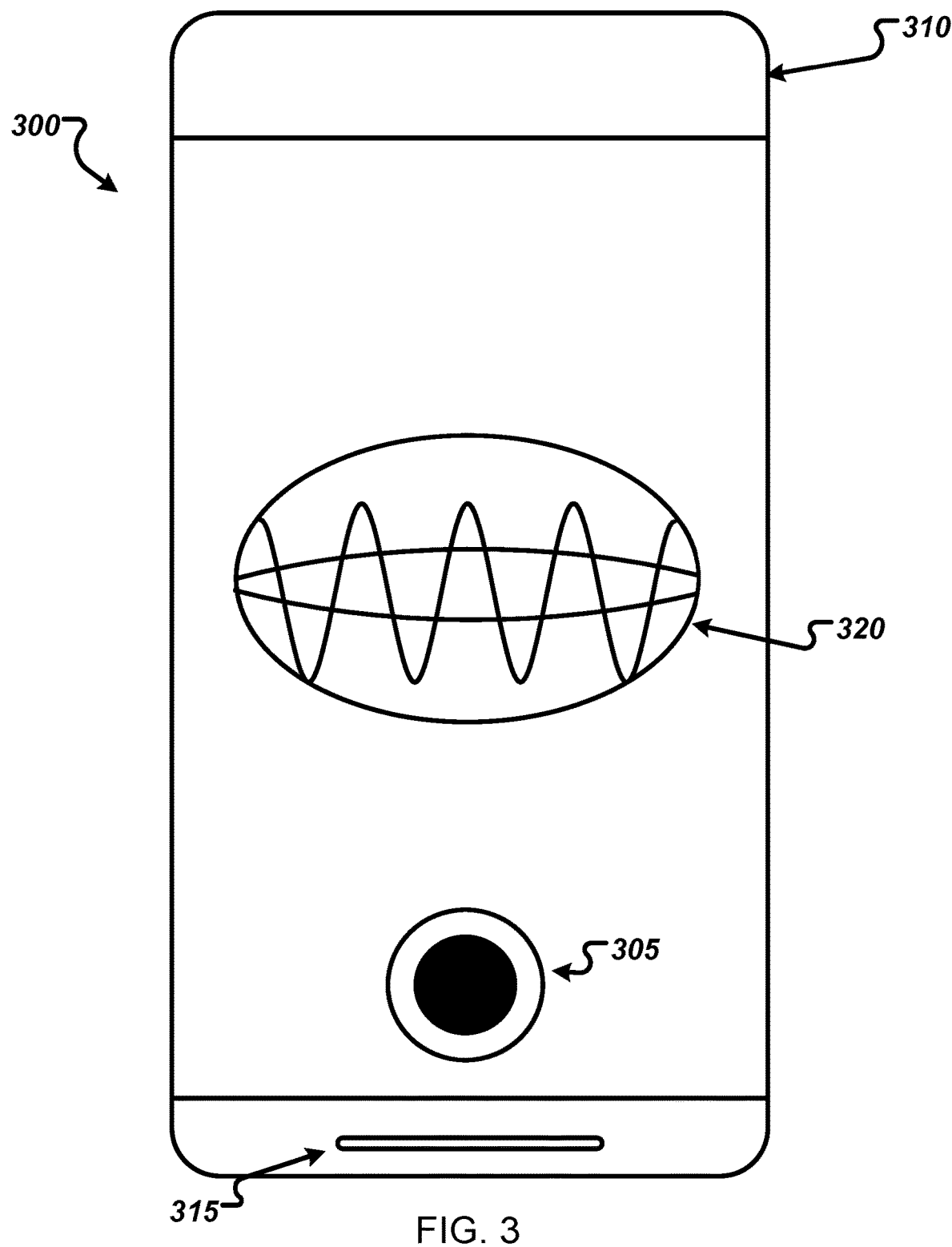
FIG. 3 illustrates an example user interface for recording audio and posting audio messages to the platform.

The user device displays 205 a user interface for recording audio and posting audio messages to the platform. Client software of the user device is configured to display the user interface. The user interface includes interactable elements, i.e., elements with which a user can interact, for the user to begin and end an audio recording. FIG. 3, below, illustrates an example user interface on the user device for recording audio and posting audio messages to the platform.

The user device records 210 audio using a microphone. The user device receives input at the user interface to begin recording audio, e.g., by recording audio while receiving a continuous touch input or mouse press at a user interface element configured to receive input to start and stop audio recording. In some implementations, the user interface is configured to receive input to start and stop audio recording by button press or some other element to toggle audio recording.

The audio content recorded can be any audio within perceptual range of the microphone of the user device. For example, the audio content can be of a live physical event occurring proximate to the user device, e.g., a conference, a show, or presentation. As another example, the audio content can include speech from one or more sources, e.g., the user of the user device.

In some implementations, while the user device records audio, the user device displays a graphic or animation indicating that the user device is actively recording audio. In some implementations, the user device can display a modulating waveform while recording the audio. The waveform can be a looped, pre-rendered animation, or in some implementations can be rendered using a wave function that includes random amplitudes and wavelengths to simulate a waveform. In some implementations, the user device simulates the animated waveform by sampling an amplitude and frequency.

The simulated waveform requires fewer computational resources to produce in real-time than a waveform that corresponds to audio being recorded. In some implementations, however, the user device generates the waveform to accurately match the amplitudes and frequencies of the incoming audio.

Other animations, graphics, and images—both still and animated—are possible. As another example, the user interface can display an animated avatar, e.g., of the user or of an animal, while the user device records audio. The animated avatar can be rendered to give the appearance that the avatar is speaking or otherwise making a sound, e.g., playing an instrument.

After recording the audio, the user device generates 215 a video in any audiovisual format, e.g., MP4. The soundtrack of the video is the recorded audio, and the frames of the video represent the animation or graphic displayed on the user device while the user device recorded the audio.

In some implementations, the frames of the video are of minimal video content, e.g., a solid color or still image, as described above with reference to FIG. 1. As described in more detail below, when an audio message with a generated video is played back on a requesting user device, the client software of the user device can render a graphic, image, or animation to accompany the audio of the message when it is played back. The video itself can be of minimal video content, and accordingly of a smaller file size than if a pre-rendered animation or graphic was generated as part of the video.

Metadata for the video can include configuration options for modifying how the user device renders the video of a requested audio message. For example, the metadata can specify the type of graphic or animation to render and display, and options for modifying the appearance, duration, or other visual qualities of the rendered graphic or animation.

Optionally, when the user device finishes recording, the user device plays back 220 the video that includes the audio recording. The user has an opportunity to review the audio as it will be heard when posted as part of an audio message to the platform. The user interface is configured to receive input that causes the user device to post the audio message. In some implementations, the input that causes the user device to post the audio message is also input to stop recording the audio.

As part of providing the audio recording for playback, the user device can render and display an animation or graphic, which may be the same or different from an animation or graphic displayed while the user device was recording audio. For example, the user device can render an animated waveform that can be scrubbed by user input to play back different portions of the recording. If an animation or graphic is specified in the video metadata, then the user device can render and display an animation or graphic according to the metadata. The user device can simulate the actual waveform for the audio recording, as described above, or the user device can generate an accurate waveform as a visual counterpart for the audio recording as it is played back for user review.

In some implementations, the play back of the audio 220 and the video modification 225 can be repeated multiple times. For example, after modifying 225 the video, the video is played back 220 and can be further modified 225 and played back again. The alternation of play back and modification can repeat until the user device receives an input to proceed to post 230 the video to the platform as part of an audio message.

In some implementations, instead of playing back the video, the user device automatically posts 230 the video to the platform as part of an audio message. In those implementations, the user device does not receive input but instead posts the audio message after the video is generated. After posting the audio message, the user device can display 205 the user interface for recording additional audio. In this way, the user device can quickly record and post audio messages to the platform with a simple interface, requiring minimal input from the user.

Optionally, the user device modifies 225 the audio before posting 230 to the platform. The user device can receive input to modify (i) the soundtrack of the generated video, (ii) video frames of the video, or (iii) both. The user device continues to receive input until receiving a confirmatory input, e.g., from a user, indicating that the edit phase has ended. If the user device receives input for modify the video frames of the video, then the user device can save the edits specified by the input in the video metadata. Later, when an audio message including the video is received by another user device, the user device can render and display an appropriate graphic or animation according to the video metadata.

In general, the user device can modify the generated video according to any audiovisual editing technique. For example, the user device can edit audio properties, e.g., pitch, volume, treble, or bass, of the recorded audio. As another example, the user device can apply audio filters to the video, or modify the appearance, e.g., modify color, shape, or animation style, of the waveform rendered and displayed by a user device during playback.

In some implementations, the user device receives input corresponding to different sound effects that can be added to the audio recording. Sound effects can include short, e.g., 1-4 seconds, recordings of instruments or other sources of sound that play in addition to the audio of the recording. Sound effects can be of any predefined length of audio from other recorded audio.

Sound effects can be inserted or overlaid as part of the audio recording. The user device receives input specifying a timestamp for the audio recording during which a sound effect is selected for insertion or overlaying. When a sound effect is inserted, the audio recording is extended by the length of the sound effect. After the sound effect is played, the audio from the recording resumes. When a sound effect is overlaid over the audio recording, both the sound effect and the audio at the specified timestamp are played at the same time. Multiple sound effects can be added to the same point in time indicated by the timestamp.

In some implementations, the user device overlays markers on the waveform, indicating that a sound effect has been inserted at a certain time of the recording. The user input for selecting and inserting a sound effect can be received by the user device through a drag-and-drop gesture detected by the user device, in which a visual marker corresponding to a particular sound effect is dragged and placed on top of a portion of the waveform also displayed. The visual markers are displayed until the user device receives an input from the user to finish editing. In these implementations, the waveform includes a series of points, each corresponding to a timestamp within the duration of the audio recording.

The user device posts 225 an audio message including the video to the platform. In some implementations, the user device automatically posts an audio message after finishing the audio recording, without receiving additional user input. Because editing of the generated video is optional, in some implementations the user device posts the audio message after receiving a post request from the user. A user of the user device can provide audio content in real time. As a result, the user device facilitates sending audio messages to the platform quickly and using a simple interface.

Instead of generating the video, in some implementations the user device records audio and sends the audio to the messaging platform. A platform server, e.g., the platform server 110*a* of FIG. 1, is configured to process the received audio recording through the audio message engine 112*a* and to generate a video with the audio recording soundtrack, as described above. By sending the audio recording to the platform, the platform can generate a higher pixel resolution video than what is possible by the native resolution of the user device.

After the platform generates the video, the platform can post an audio message with the video on behalf of the user of the user device. When the audio message is posted, the included video is posted at a source resolution equal to higher than the resolution of the display of any user device. When the audio message is retrieved by a user device, the message is retrieved and down-sampled as necessary to allow the user device to display the included video at the device's native resolution, which can be equal to or less than the source resolution used to generate the video.

In some implementations in which the audio recording is sent to the platform for generating the video, the user device also sends video metadata specifying edits received by the user device for editing the video. The platform can generate the video for the audio message according to the received audio recording and metadata.

A user device receiving the audio message can determine whether the video content of the video file of the audio message is of programmatically generated minimal video content. In response, the user device can play back the video file in the audio message with video content rendered by the user device, in place of the minimal video content, and also play back the audio recording. The rendered video content can be locally stored on the user device or generated by the user device, and is generally of a higher resolution than the minimal video content. Rather than transmit the audio message with the higher resolution (and therefore, larger) video, the receiving user device can substitute the minimal video content with the rendered video content locally and before display on the user device, thereby reducing network utilization.

Generally, the user device determines that the audio message includes minimal video content as described in this specification, by comparing data specifying the video portion of the video in the audio message with a known signature for data specifying minimal video content. For example, minimal video content can be generated and inserted in audio messages of the platform uniformly, meaning that all the minimal video content is the same from message-to-message. In this example, the signature can be a hash value of the minimal video content, and the client for the receiving user device can compare the hash with a known hash value to determine that the audio message includes minimal video content.

In some implementations, the minimal video content varies from message-to-message, but can include a flag indicating that that the content has been programmatically generated, and therefore being used as a placeholder to allow for encoding the recorded audio in an audiovisual format, as described above. In these implementations, the client for the user device receiving the audio message determines that the message includes minimal video content by checking for the presence or absence of the designated flag.

FIG. 3 illustrates an example user interface 300 for recording audio and posting audio messages to the platform. This and any other interface described in this specification can be implemented with any additional feature to facilitate user accessibility, e.g., high-contrast display and speech-to-text functionality for visually-impaired users, closed captioning for audio content provided as part of a user interface for hearing-impaired users, and voice input functionality as an alternative or in addition to tactile input for interacting with elements of the displayed user interface. The user interface 300 includes a recording input element 305, e.g., a button, in which a user of a user device 310 displaying the interface 300 can interact with to begin recording audio using a microphone 315. A user can interact with the interface 300 through tactile input, e.g., by tapping the display of the user device 310, or in any other manner, e.g., voice input. As the microphone 315 records audio, the user device 310 displays an animated waveform 320. The animated waveform 320 can modulate or pulsate as a visual indicator that audio is actively being recorded. In some implementations, the user interface 300 includes a message posting element for receiving input to post the audio recording as part of an audio message.

In some implementations, the user interface for recording and posting audio can be condensed as a single UI element that, when interacted with by the user, causes the user device to record audio and post audio recording as described above. The single UI element can be a button, and in some implementations, the button can be overlaid to "float" over a current user interface displayed on the user device. The button can be any shape or size up to the size of the display of the user device. In these implementations, the button can be moved about the display of the user device independently of the underlying user interface.

Figure 4:
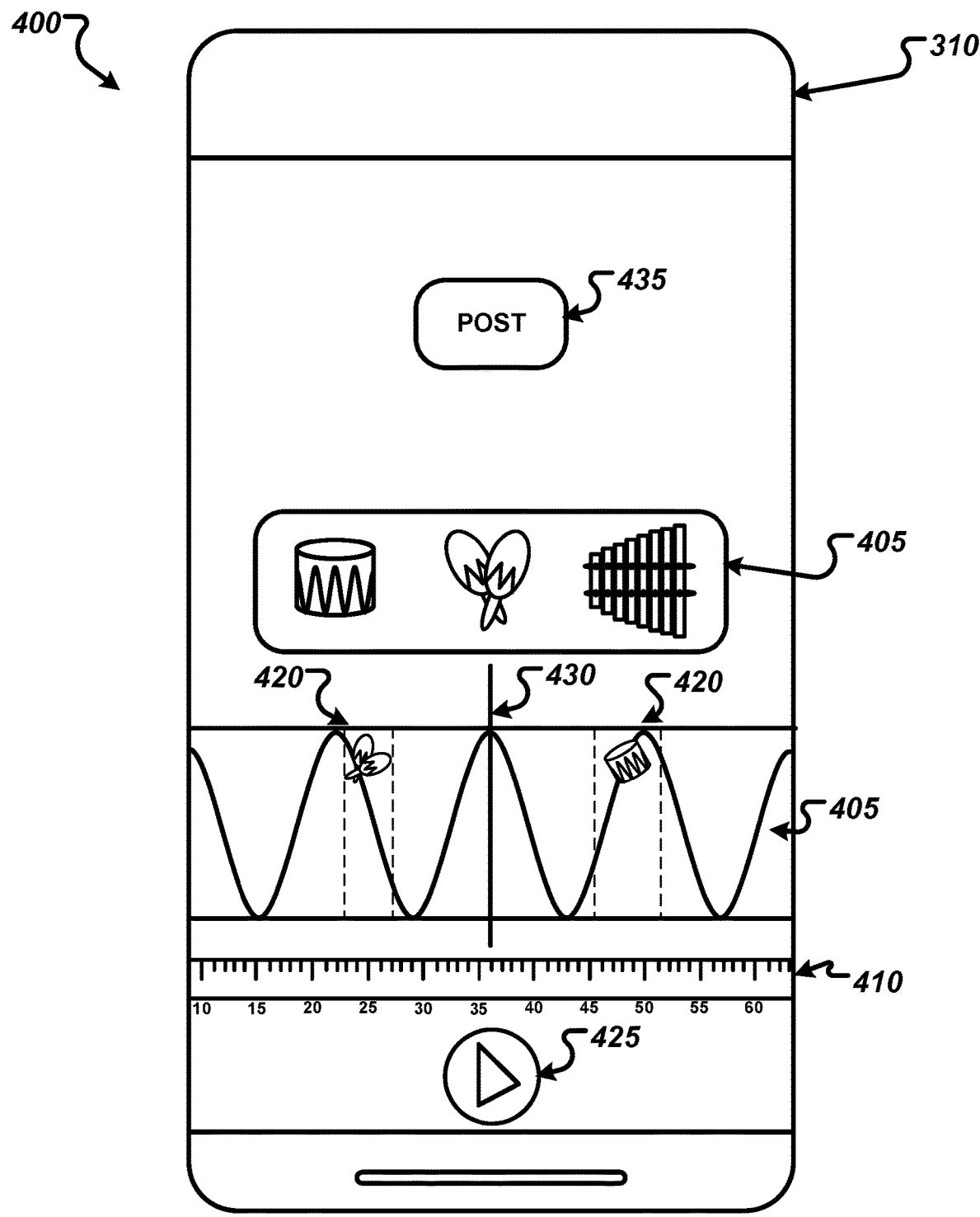
FIG. 4 illustrates an example user interface for modifying an audio recording before posting the audio recording as part of an audio message to the platform.

FIG. 4 illustrates an example user interface 400 for modifying an audio recording before posting it as part of an audio message to the platform. The user interface 400 includes a waveform 405 and a time slider element 410. The waveform 405 and the time slider element 410 span the width of the display of the user device 310 and can be scrubbed backwards and forwards in time according to user input, e.g., by a touch-and-drag gesture from a user.

Although the waveform 405 is shown as a sinusoidal wave, the user device can display the waveform 405 in other suitable wave formats, e.g., square waves, sawtooth waves, or triangular waves; or in other non-wave formats, such as pulsating bars arranged along a line or circle. As the waveform 405 is scrubbed, the time slider element 410 is also scrubbed to indicate times of the audio recording corresponding to the visible portion of the waveform 405.

The user interface 400 also includes sound effect markers 415 that a user interacts with to add, remove, and modify the audio recording. A sound effect marker represents a short, e.g., 1 to 4 seconds, sound effect. A sound effect marker can represent a corresponding sound effect pictorially, e.g., a picture of an instrument played, or textually, e.g., the name of the instrument played in the sound effect. The user interface 400 can receive a first input selecting a sound effect marker, and a second input selecting a portion in the waveform 405 where the sound effect should be played in the audio recording.

The waveform 405 is annotated with audio sound effect markers 420 where the waveform 405 is modified by one or more sound effects. The width of each marker 420 indicates the length of the corresponding sound effect when played back. The user interface 400 can receive additional input to add, remove, or modify the position of the markers 420 after they are placed on the waveform 405.

The user interface 400 also includes a playback element 425. When the playback element 425 receives input, the user device 310 can start or stop playback of the audio recording from a current time indicated by a time marker 430. The user interface 400 also includes a post element 425 that can receive input and cause the user device to post an audio message including the audio recording—with any edits—to the platform.

Figure 5:
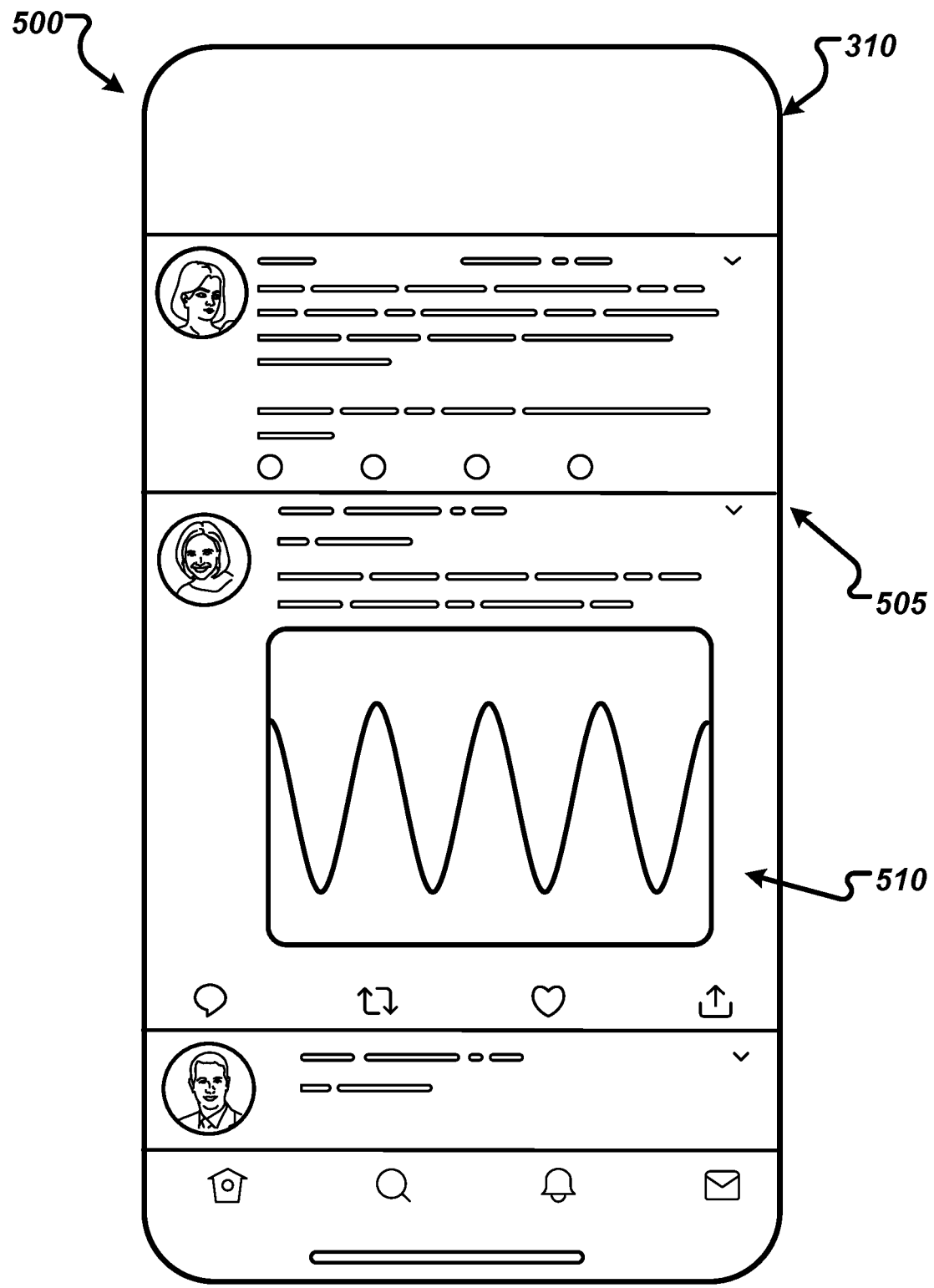
FIG. 5 illustrates an example user interface displaying a message stream that includes an audio message.

FIG. 5 illustrates an example user interface 500 displaying a message stream 505 that includes an audio message 510. The audio message 510 plays its corresponding audio content when the message 510 is in view on the display of the user device 310. Alternatively, the audio message 510 does not play its audio content unless the user interface 500 receives an input, e.g., a gesture to the user interface 500 indicating that the audio message 510 has been selected for playback.

Figure 6:
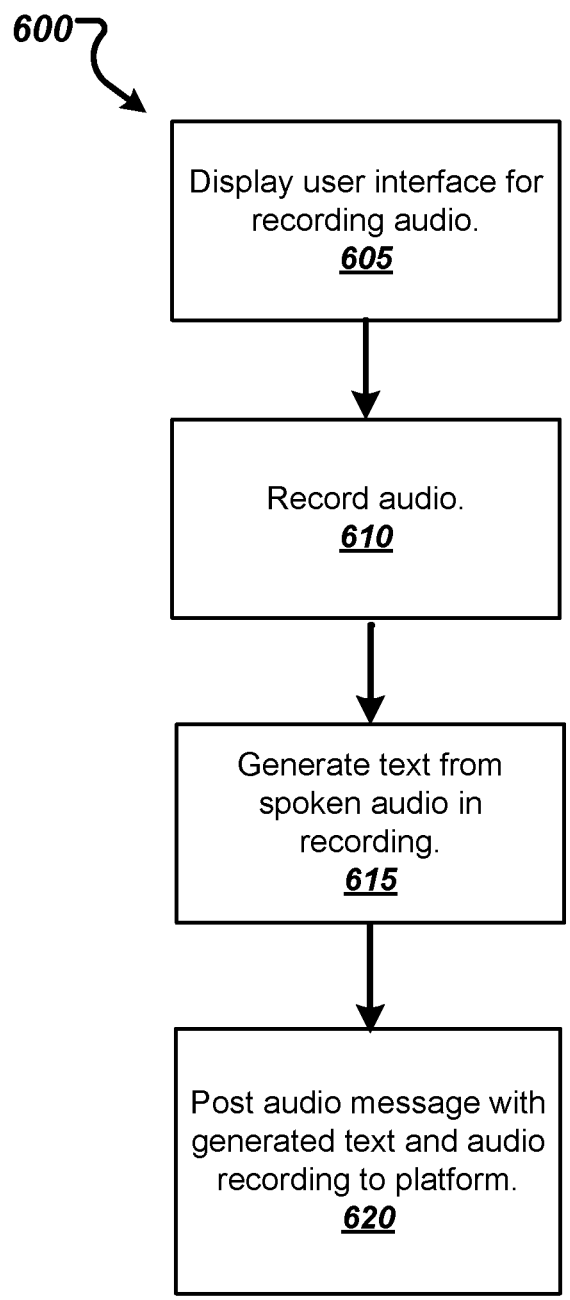
FIG. 6 is a flowchart of an example process for generating text from recorded audio and posting a message that includes the generated text to an online social messaging platform.

FIG. 6 is a flowchart of an example process 600 for generating text from recorded audio and posting a message that includes the generated text to an online social messaging platform. For convenience, the process 600 will be described as being performed by a user device programmed appropriately in accordance with this specification. For example, any one of the user devices 104a-n of FIG. 1, appropriately programmed, can perform the process 600. In the description below, reference is made to a single user device, although it is understood that more than one user device can perform the example process 600 in parallel.

The user device displays 605 a user interface for recording audio. The user interface can be, for example, the user interface as illustrated in FIG. 3 and described above, and in general includes an input element for starting and stopping recording.

The user device records 610 the audio. As described above with reference to FIG. 2, the user device records audio using a microphone on the user device, while displaying a graphic or animation, e.g., an animated waveform, indicating that the device is recording.

The user device generates text 615 from detected speech in the audio recording. The user device can generate the text using any suitable speech-to-text software technique. In some implementations, the user device generates and displays text on the user device while recording audio at the same time.

In some implementations, instead of the user device generating the text from speech detected in the audio recording, the user device sends the audio recording to the platform, and the platform processes the recording to generate the text. In some implementations, the user device modifies the audio recording according to received input, as described above with reference to FIG. 2.

The user device posts 620 an audio message that includes the generated text. The user device posts 620 the audio message with the generated text automatically, without playback, facilitating rapid dissemination of content to the platform while also provided different formats in which users receiving the audio message consume the content. In some implementations, the user device displays the generated text, the generated video, or both, for playback and confirmation before posting the audio message to the platform.

In some implementations in which the generated text is displayed before the audio message is posted, the user device is configured to receive input indicating edits to the text. For example, the user device can receive input to edit text, e.g., because the speech-to-text generation was not fully accurate, or to provide additional text to include with the message before being posted. Terms within the generated text can also be used by the platform for indexing the posted audio message. The platform can extract and store terms from the generated text, and later serve search requests by searching an index of messages posted to the platform. The index can include the extracted terms for the posted audio message.

If the platform imposes a text limit, e.g., character or word limit on text in messages, then the generated text is edited to conform to the text limit. The user device can automatically edit the text to include only the beginning portion of the generated text, up to the text limit. Alternatively, the user interface displays the generated text, and is further configured to receive input, e.g., touch or swipe gestures, indicating which text to remove to meet the text limit. Alternatively, the platform can make an exception for text generated from audio and a different text limit could be set for the accompanying text, up to and including no limit at all. The accompanying text can be rendered with a style to match the regularly displayed text, or rendered according to a different style, e.g., a font that provides a visual indication to the user that the text was generated for the associated audio recording.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, which is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising: receiving, by a first client on a first user device, a request to record an audio message for a social messaging platform, wherein the first client is software running on the first user device, wherein the first client is configured to provide a user interface for the platform for a user using the first user device who is logged in to a user account on the platform, and wherein the request is received through the user interface; recording audio through a microphone of the first user device; generating a platform message by (i) generating a video file that includes the recorded audio as an audio portion of the video file and programmatically generated minimal video content as a video portion of the video file, and (ii) including the video file in the platform message; and posting, by the first client, the platform message to the platform, in response to a post request received by the first client.

Embodiment 2 is the method of embodiment 1, further comprising: receiving, by the first client on the first user device, one or more edit requests to edit the recorded audio; and in response to the one or more edit requests and before generating the platform message, editing the recorded audio.

Embodiment 3 is the method of any one of embodiments 1 or 2, wherein the minimal video content presents an appearance of a moving waveform within a duration of the audio recording, the method comprising: receiving, by the first client on the first user device, a request to insert a sound effect at a particular point in the audio recording; receiving, by the first client on the first user device, a selection of a visual marker corresponding to a sound effect and a time input indicating when in the recorded audio to include the sound effect, wherein the visual marker is selected from among one or more visual markers displayed on the user interface; and in response to the selection of the visual marker and the time input: modifying the recorded audio to play the sound effect at the received time input in the recorded audio, and modifying the minimal video content to display the visual marker on the moving waveform at a position corresponding to the time input.

Embodiment 4 is the method of embodiment 3, wherein modifying the recorded audio comprises inserting the sound effect at the received time input in the recoded audio.

Embodiment 5 is the method of embodiments 3 or 4, wherein modifying the recording audio comprises overlaying the sound effect over the recorded audio at the received time input, wherein when the audio recording includes both the received time input and the sound effect when played back at the received time input.

Embodiment 6 is the method of any one of embodiments 1 through 5, wherein the minimal video content is an unchanging image, a monochrome image, or a loop of a waveform against a static background.

Embodiment 7 is the method of embodiment 6, wherein the waveform is a visual representation of at least a portion of the recorded audio to the first user device.

Embodiment 8 is the method of any one of embodiments 1 through 7, wherein the video file is an MPEG-4 file.

Embodiment 9 is the method of any one of embodiments 1 through 8, wherein the method further comprises: receiving, by the first client, a speech-to-text request; in response to the speech-to-text request: detecting speech in the recorded audio; generating text corresponding to the detected speech, and displaying the generated text corresponding to the detected speech, wherein generating the platform message comprises adding the generated text to the platform message; and using, by the social messaging platform, the generated text to index the platform message for searching.

Embodiment 10 is a method comprising: receiving, by a client on a user device, a platform message comprising a video file, the video file having a video portion and an audio portion; and determining, by the client, that the video portion of the video file comprises minimal video content that has been programmatically generated, and in response: obtaining second video content by the client, the second video content being different from the minimal video content, and displaying, on a display of the user device, the second video content while playing the audio portion of the video file of the platform message.

Embodiment 11 is the method of embodiment 10, wherein obtaining the second video content comprises generating, by the client, the second video content.

Embodiment 12 is method of any one of embodiments 10 or 11, wherein determining that the video portion of the video file comprises the minimal video content comprises: determining that a signature of data specifying the video portion of the video file matches a predetermined signature of data corresponding to programmatically generated minimal video content.

Embodiment 13 is a system comprising: one or more computers and one or more storage devices storing instructions that are operable, when executed by the one or more computers, to cause the one or more computers to perform the method of any one of claims 1 to 12.

Embodiment 14 is a computer storage medium encoded with a computer program, the program comprising instructions that are operable, when executed by data processing apparatus, to cause the data processing apparatus to perform the method of any one of claims 1 to 12.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
    receiving, by a first client on a first user device, a request to record an audio message for a social messaging platform, wherein the first client is software running on the first user device, wherein the first client is configured to provide a user interface for the social messaging platform for a user using the first user device who is logged in to a user account on the social messaging platform, and wherein the request is received through the user interface;
    recording, by the first client, in response to the request, audio with a first file size received through a microphone of the first user device;
    programmatically generating, by the first client, minimal artificial video content with a second file size that is less than the first file size of the recorded audio;
    generating a platform message by (i) encoding the recorded audio with frames of the minimal artificial video content and generating a video file that includes the recorded audio as an audio portion of the video file and the minimal artificial video content as a video portion of the video file, and (ii) including the video file in the platform message; and
    posting, by the first client, the platform message to the social messaging platform and causing a second client to decode, using a codec for an audiovisual file format, the video file included in the platform message and use the minimal artificial video content as a placeholder in the video file for second video content that will be rendered in place of the minimal artificial video content, in response to a post request received by the first client.

2. The method of claim 1, further comprising:
    receiving, by the first client on the first user device, one or more edit requests to edit the recorded audio;
    and in response to the one or more edit requests and before generating the platform message, editing the recorded audio.

3. The method of claim 1, wherein the minimal artificial video content presents an appearance of a moving waveform within a duration of the audio recording, the method comprising:
    receiving, by the first client on the first user device, a request to insert a sound effect at a particular point in the audio recording;
    receiving, by the first client on the first user device, a selection of a visual marker corresponding to the sound effect and a time input indicating when in the recorded audio to include the sound effect, wherein the visual marker is selected from among one or more visual markers displayed on the user interface; and
    in response to the selection of the visual marker and the time input:
        modifying the recorded audio to play the sound effect at the received time input in the recorded audio, and
        modifying the minimal artificial video content to display the visual marker on the moving waveform at a position corresponding to the time input.

4. The method of claim 3, wherein modifying the recorded audio comprises inserting the sound effect at the received time input in the recorded audio.

5. The method of claim 3, wherein modifying the audio recording comprises overlaying the sound effect over the recorded audio at the received time input, wherein the audio recording includes both the received time input and the sound effect when played back at the received time input.

6. The method of claim 1, wherein the minimal artificial video content is an unchanging image, a monochrome image, or a loop of a waveform against a static background.

7. The method of claim 6, wherein:
    the minimal artificial video content is the loop of the waveform against the static background; and
    the waveform is a visual representation of at least a portion of the recorded audio to the first user device.

8. The method of claim 1, wherein the video file is an MPEG-4 file.

9. The method of claim 1, wherein programmatically generating the minimal artificial video content comprises: generating video frames including information describing the recorded audio.

10. The method of claim 1, wherein the platform message includes a signature comprising a hash value of the minimal artificial video content.

11. The method of claim 1, wherein the platform message includes a flag that a) indicates that the minimal artificial video content has been programmatically generated, and b) causes the second client to use the minimal artificial video content as the placeholder.

12. A system comprising:
one or more computers and one or more storage devices on which are stored instructions that are operable, when executed by the one or more computers, to cause the one or more computers to perform operations comprising:
receiving, by a first client on a first user device, a request to record an audio message for a social messaging platform, wherein the first client is software running on the first user device, wherein the first client is configured to provide a user interface for the social messaging platform for a user using the first user device who is logged in to a user account on the social messaging platform, and wherein the request is received through the user interface;
recording, by the first client, in response to the request, audio with a first file size received through a microphone of the first user device;
programmatically generating, by the first client, minimal artificial video content with a second file size that is less than the first file size of the recorded audio;
generating a platform message by (i) encoding the recorded audio with frames of the minimal artificial video content and generating a video file that includes the recorded audio as an audio portion of the video file and the minimal artificial video content as a video portion of the video file, and (ii) including the video file in the platform message; and
posting, by the first client, the platform message to the social messaging platform and causing a second client to decode, using a codec for an audiovisual file format, the video file included in the platform message and use the minimal artificial video content as a placeholder in the video file for second video content that will be rendered in place of the minimal artificial video content, in response to a post request received by the first client.

13. The system of claim 12, wherein the operations further comprise:
receiving, by the first client on the first user device, one or more edit requests to edit the recorded audio; and
in response to the one or more edit requests and before generating the platform message, editing the recorded audio.

14. The system of claim 12, wherein the minimal artificial video content presents an appearance of a moving waveform within a duration of the audio recording, the operations further comprising:
receiving, by the first client on the first user device, a request to insert a sound effect at a particular point in the audio recording;
receiving, by the first client on the first user device, a selection of a visual marker corresponding to the sound effect and a time input indicating when in the recorded audio to include the sound effect, wherein the visual marker is selected from among one or more visual markers displayed on the user interface; and
in response to the selection of the visual marker and the time input:
modifying the recorded audio to play the sound effect at the received time input in the recorded audio, and
modifying the minimal artificial video content to display the visual marker on the moving waveform at a position corresponding to the time input.

15. The system of claim 14, wherein modifying the recorded audio comprises inserting the sound effect at the received time input in the recorded audio.

16. The system of claim 14, wherein modifying the audio recording comprises overlaying the sound effect over the recorded audio at the received time input, wherein the audio recording includes both the received time input and the sound effect when played back at the received time input.

17. The system of claim 12, wherein the minimal artificial video content is an unchanging image, a monochrome image, or a loop of a waveform against a static background.

18. The system of claim 17, wherein:
the minimal artificial video content is the loop of the waveform against the static background; and
the waveform is a visual representation of at least a portion of the recorded audio to the first user device.

19. The system of claim 12, wherein the video file is an MPEG-4 file.

20. The system of claim 12, wherein the operations further comprise:
receiving, by the first client, a speech-to-text request; and
in response to the speech-to-text request:
detecting speech in the recorded audio,
generating text corresponding to the detected speech, and
displaying the generated text corresponding to the detected speech;
wherein generating the platform message comprises adding the generated text to the platform message; and
using, by the social messaging platform, one or more extracted terms from the generated text to index the platform message.

21. One or more non-transitory computer-readable storage media encoded with instructions that, when executed by one or more computers, cause the one or more computers to perform operations comprising:
receiving, by a first client on a first user device, a request to record an audio message for a social messaging platform, wherein the first client is software running on the first user device, wherein the first client is configured to provide a user interface for the social messaging platform for a user using the first user device who is logged in to a user account on the platform, and wherein the request is received through the user interface;
recording, by the first client, in response to the request, audio with a first file size received through a microphone of the first user device;
programmatically generating, by the first client, minimal artificial video content with a second file size that is less than the first file size of the recorded audio;
generating a platform message by (i) encoding the recorded audio with frames of the minimal artificial video content and generating a video file that includes the recorded audio as an audio portion of the video file and the minimal artificial video content as a video portion of the video file, and (ii) including the video file in the platform message; and posting, by the first client, the platform message to the social messaging platform and causing a second client to decode, using a codec for an audiovisual file format, the video file included in the platform message and use the minimal artificial video content as a placeholder in the video file for second video content that will be rendered in place of the minimal artificial video content, in response to a post request received by the first client.

22. The computer-readable storage media of claim 21, wherein the operations further comprise:
   receiving, by the first client on the first user device, one or more edit requests to edit the recorded audio; and
   in response to the one or more edit requests and before generating the platform message, editing the recorded audio.

23. The computer-readable storage media of claim 21, wherein the minimal artificial video content presents an appearance of a moving waveform within a duration of the audio recording, the operations further comprising:
   receiving, by the first client on the first user device, a request to insert a sound effect at a particular point in the audio recording;
   receiving, by the first client on the first user device, a selection of a visual marker corresponding to the sound effect and a time input indicating when in the recorded audio to include the sound effect, wherein the visual marker is selected from among one or more visual markers displayed on the user interface; and
   in response to the selection of the visual marker and the time input:
      modifying the recorded audio to play the sound effect at the received time input in the recorded audio, and
      modifying the minimal artificial video content to display the visual marker on the moving waveform at a position corresponding to the time input.

24. The computer-readable storage media of claim 23, wherein modifying the recorded audio comprises inserting the sound effect at the received time input in the recorded audio.

25. The computer-readable storage media of claim 23, wherein modifying the audio recording comprises overlaying the sound effect over the recorded audio at the received time input, wherein the audio recording includes both the received time input and the sound effect when played back at the received time input.

26. The computer-readable storage media of claim 21, wherein the minimal artificial video content is an unchanging image, a monochrome image, or a loop of a waveform against a static background.

27. The computer-readable storage media of claim 26, wherein:
   the minimal artificial video content is the loop of the waveform against the static background; and
   the waveform is a visual representation of at least a portion of the recorded audio to the first user device.

28. The computer-readable storage media of claim 21, wherein the video file is an MPEG-4 file.

29. The computer-readable storage media of claim 21, wherein the operations further comprise:
   receiving, by the first client, a speech-to-text request; and
   in response to the speech-to-text request:
      detecting speech in the recorded audio,
      generating text corresponding to the detected speech, and
      displaying the generated text corresponding to the detected speech; and
   wherein generating the platform message comprises adding the generated text to the platform message.

* * * * *